J. A. HOUSE.
MECHANICAL MOVEMENT.

No. 188,465.  Patented March 20, 1877.

WITNESSES
Wm A. Skunkle
J. Stith

INVENTOR
James A. House.
By his Attorneys.
Baldwin, Hopkins & Peyton.

N. PETERS, PHOTO-LITHOGRAPHER, WASHINGTON, D.C.

UNITED STATES PATENT OFFICE.

JAMES A. HOUSE, OF BRIDGEPORT, CONNECTICUT.

IMPROVEMENT IN MECHANICAL MOVEMENTS.

Specification forming part of Letters Patent No. 188,465, dated March 20, 1877; application filed March 1, 1877.

*To all whom it may concern:*

Be it known that I, JAMES ALFORD HOUSE, of Bridgeport, in the county of Fairfield and State of Connecticut, have invented certain new and useful Improvements in Mechanical Movements, of which the following is a specification:

My invention principally relates to a mechanical movement of the class which are operated by treadles, usually denominated "foot-powers;" and my object is to provide a cheap, simple, and efficient apparatus, especially designed for driving light machinery, such as scroll-saws, lathes, &c.

My improvements consist in the combination of a treadle, provided with a spring, to return it to its normal position after being depressed, an endless belt or strap passing at one end around a pulley on the shaft or wheel to be driven, and a griper or clamp carried by the treadle, and acting upon the belt during the movements in one direction of the treadle.

My improvements also consist in the combination of the driven wheel, the endless belt, the pulley connected with the driven wheel, around which pulley the endless belt passes at one end, a yieldingly-mounted or self-adjusting tension pulley or support, around which the opposite end of the belt passes, and a griper or clamp, moving to and fro lengthwise of the belt, and automatically connected with and disconnected from the belt, so that in moving in one direction the griper seizes and imparts motion to the belt, and releases it on the reverse movement.

My improvements further consist in certain novel constructions and combinations of parts, which will hereinafter specifically be designated.

Figure 1:
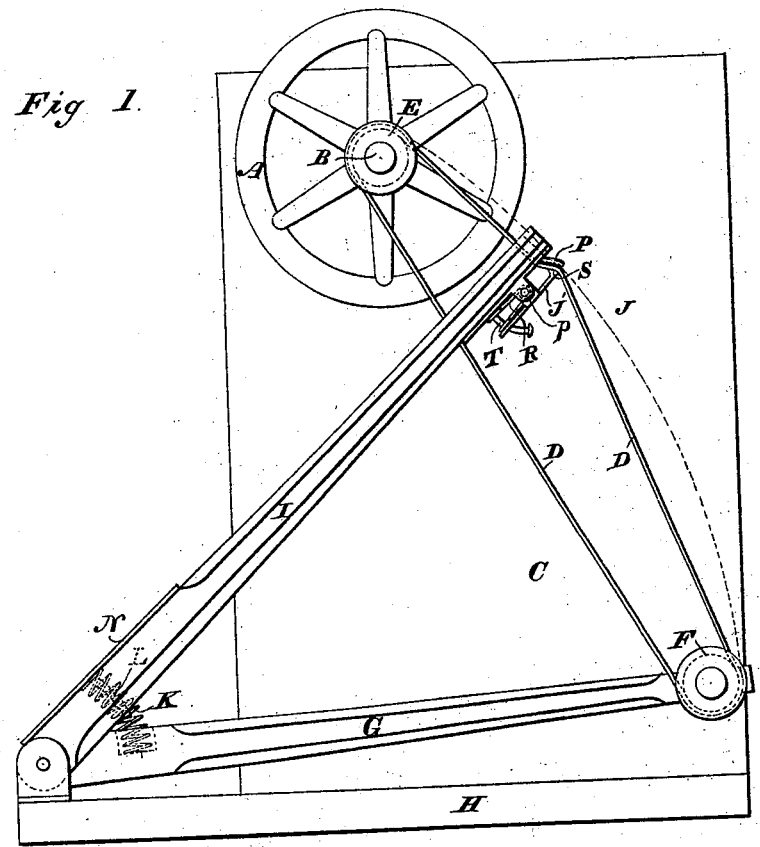
Figure 3:
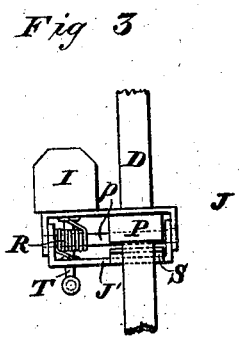
Figure 4:
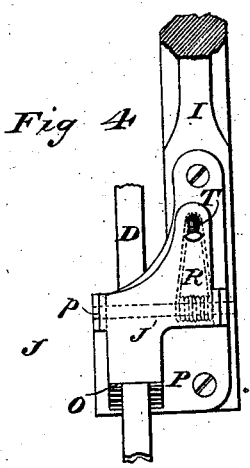
Figure 2:
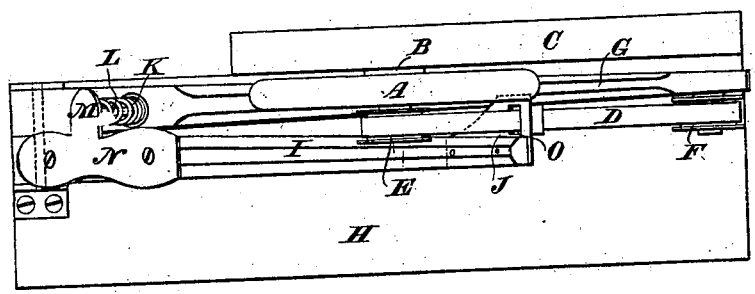

In the accompanying drawings, Figure 1 is a view in elevation of my improvements. Fig. 2 is a plan or top view of the same. Fig. 3 is an end view of the treadle-bar, showing the clamping device or griper. Fig. 4 is an inverted plan view of the end of the treadle-bar and clamping device or griper.

The wheel A or shaft B to be driven is mounted in a suitable upright or frame, C. The wheel A may be suitably connected by a belt, crank, and pitman or gearing with the machine to which motion is to be imparted by the revolution of the wheel; or the shaft B may be connected by means of a crank or gearing with the machine or apparatus to be set in motion, and the wheel A serve simply as a fly-wheel. The wheel and shaft are driven by an endless belt, D, which passes at one end around a pulley, E, fast on the shaft. The other end of the belt passes around a tension-pulley, F; or, if preferred, a shoe or non-rotating support may be substituted for the lower belt-supporting pulley. This pulley is shown as mounted upon the outer end of a yielding lever or tension-arm, G; but instead of employing the lever, the pulley might be yieldingly mounted upon the frame C or base H of the machine. A treadle, I, pivoted at its heel upon the same rod that secures the tension-lever to the floor or base H, is connected at its free end with the endless strap or belt by means of a griper or clamp, J. This clamp gripes the belt as it is moved in one direction, but releases it and slips along its surface when moved in a contrary direction. In this manner, by a succession of impulses, the driven shaft and wheel are kept in motion when desired. To throw up the treadle after being pressed down by the foot of the operator, a coiled spring, K, or other suitable spring is employed. This spring also serves to bear down the tension-lever G. A rod, L, carried by a projection, M, on the foot-rest N of the treadle, serves as a guide and holder for the upper end of the spring, the lower end being received by a recess in the tension-lever. Obviously a plate-spring or elastic cushion might be substituted for the coiled spring, and, when the tension-lever is dispensed with, this spring would bear at one end upon the base of the machine, or upon the floor.

The reciprocating belt-griper or clamp moves back and forth in the arc of a circle of which the pivot of the treadle is the center. The path traversed by the clamp is represented by dotted lines, Fig. 1, by reference to which it will be seen that the location of the lower pulley or tension-support for the belt is constantly shifting, the position occupied by it relatively to the driven pulley changing to accommodate the variations in the length of the belt which take place at every reciprocation of the griper, owing to the deflection sidewise of the belt, as shown by the dotted lines.

The griper J is, by preference, constructed, as shown in the drawings, of two pieces of metal, one, the main stationary part, being secured to the under side of the treadle end, and provided with an opening, O, for the belt to pass through at the side of the treadle, and an angular lip or bearing, P, having serrations, against which the belt is pressed upon the downstroke of the treadle by the remaining movable part J' of the clamp. This working member of the clamp is pivoted so as to rock upon the fixed plate, by means of lugs upon both parts of the clamp, through which passes a pivot-pin, p. A spring, R, constantly presses the heel of the rocking section of the griper outward, thus causing its outer end S to bear upon the belt and clamp it with a yielding pressure against the lip P of the fixed plate or stationary part of the clamp. The clamping-flange or outer end S of the rocking clamp-section may be corrugated or serrated, like the inner surface of the lip P.

A stud, T, projecting from the fixed clamp-section, and passing through the heel end of the movable clamp-section, serves to limit the movement of the rocking section, as well as to secure the ends of the spring R, and protect them from being displaced, and also guard against the movement of the spring lengthwise of the pivot-bolt.

From the foregoing description the operation of my improvements will be readily understood. The rocking clamp-section J' presses the belt against the fixed lip of the main section J upon the downward movement of the clamp, and releases it and moves independently of it upon the return stroke.

Obviously a clamp of construction differing somewhat from that herein described might be employed without departing from the spirit of my invention, and, instead of the treadle I, a pivoted arm, rocked in any suitable manner, might be employed to reciprocate the clamp.

I claim as my invention—

1. The combination, substantially as hereinbefore set forth, of a wheel or shaft to be driven, a pulley thereon, an endless belt passing at one end around said pulley, a treadle, provided with a spring for throwing it up after being depressed, and a griper or clamp, carried by the treadle, and acting upon the belt.

2. The combination of the driven shaft or wheel, the pulley connected therewith, the endless belt, passing at one end around said pulley, a yieldingly-mounted self-adjusting pulley or support, around which the opposite end of the belt passes, and a reciprocating griper or clamp automatically connected with and disconnected from the belt, substantially as hereinbefore set forth, whereby variations in the length of the belt are accommodated.

3. The combination of the treadle, the tension-lever, the endless belt, the pulley or support for the lower end of the belt carried by the tension lever, the driven pulley, around which the opposite end of the belt passes, and a clamp or griper carried by the treadle, and connecting with and imparting motion to the belt, these members being constructed and operating substantially as hereinbefore set forth.

4. The belt-clamp constructed, substantially as hereinbefore set forth, of a main fixed section, slotted for the passage of the belt, and having a roughened or serrated bearing therefor, and the movable section pivoted to the main section, having a flange at its outer end, between which and the bearing on the main section the belt passes, and the spring between the two sections, whereby the movable section is held in position, to facilitate the griping of the belt.

In testimony whereof I have hereunto subscribed my name.

JAMES ALFORD HOUSE.

Witnesses:
  CHAS. H. DIMOND,
  FREDK. L. HEARSON.